(12) United States Patent
Yamanaka et al.

(10) Patent No.: US 9,829,685 B2
(45) Date of Patent: Nov. 28, 2017

(54) OPTICAL SYSTEM AND IMAGE PICKUP APPARATUS

(71) Applicant: Tamron Co., Ltd., Saitama-shi (JP)

(72) Inventors: Hisayuki Yamanaka, Saitama (JP); Keisuke Okada, Saitama (JP); Yoshito Iwasawa, Saitama (JP)

(73) Assignee: Tamron Co., Ltd., Saitama-Shi (JP)

( * ) Notice: Subject to any disclaimer, the term of this patent is extended or adjusted under 35 U.S.C. 154(b) by 0 days.

(21) Appl. No.: 15/044,478

(22) Filed: Feb. 16, 2016

(65) Prior Publication Data

US 2016/0238823 A1  Aug. 18, 2016

(30) Foreign Application Priority Data

Feb. 17, 2015  (JP) ................. 2015-028905

(51) Int. Cl.
| | |
|---|---|
| *G02B 13/02* | (2006.01) |
| *G02B 15/14* | (2006.01) |
| *G02B 17/00* | (2006.01) |
| *G02B 9/12* | (2006.01) |
| *G02B 9/14* | (2006.01) |
| *G02B 7/02* | (2006.01) |
| *G02B 9/64* | (2006.01) |
| *G02B 13/00* | (2006.01) |
| *G02B 27/00* | (2006.01) |

(52) U.S. Cl.
CPC ............. *G02B 13/02* (2013.01); *G02B 9/64* (2013.01); *G02B 13/006* (2013.01); *G02B 27/0025* (2013.01)

(58) Field of Classification Search
CPC ........ G02B 13/02; G02B 13/04; G02B 13/00; G02B 13/0035; G02B 9/12; G02B 23/243; G02B 13/18; G02B 15/177; G02B 15/173; G02B 25/001
USPC ........ 359/745, 748–749, 753, 757, 784–788, 359/811–830, 733, 735, 716, 708, 359/689–690, 642–642, 645
See application file for complete search history.

(56) References Cited

U.S. PATENT DOCUMENTS

| | | | | |
|---|---|---|---|---|
| 5,009,492 | A * | 4/1991 | Hamano | ............... G02B 15/173 359/684 |
| 7,646,548 | B2 * | 1/2010 | Ohtake | ................. G02B 27/646 359/557 |
| 2014/0300804 | A1 * | 10/2014 | Ryu | ........................ G02B 13/02 348/360 |
| 2015/0378137 | A1 * | 12/2015 | Obikane | ................. G02B 13/24 359/745 |

FOREIGN PATENT DOCUMENTS

JP  2014-109700 A  6/2014

* cited by examiner

*Primary Examiner* — Dawayne A Pinkney
(74) *Attorney, Agent, or Firm* — The Webb Law Firm

(57) ABSTRACT

The optical system of the present invention includes, in order from an object side: a first lens group G1 having positive refractive power; a second lens group G2 having negative refractive power; and a third lens group G3 having positive refractive power, wherein the first lens group G1 and the third lens group G3 are fixed in an optical axis direction, while the second lens group G2 is moved in the optical axis direction to focus on from an object at infinity to an object at a finite distance, the third lens group G3 includes, in order from the object side: an object-side group G3*a*; an aperture stop S; and an image-side group G3*b*, and a specified condition is satisfied.

9 Claims, 4 Drawing Sheets

OPTICAL SYSTEM AND IMAGE PICKUP APPARATUS

CROSS-REFERENCE TO RELATED APPLICATION

This application claims priority to Japanese Patent Application No. 2015-028905 filed Feb. 17, 2015, the disclosure of which is hereby incorporated in its entirety by reference.

BACKGROUND OF THE INVENTION

Field of the Invention

The present invention relates to optical systems and image pickup apparatuses. The present invention more particularly relates to an optical system suitable for an image pickup apparatus with use of a solid-state image sensor, such as digital still cameras and digital video cameras, and to an image pickup apparatus including the optical system.

Description of the Related Art

Image pickup apparatuses with use of a solid-state image sensor, such as digital still cameras and digital video cameras, have spread. With recent development of higher-performance, smaller-size, and the like of imaging optical systems, small imaging systems are rapidly spreading in particular.

Various single-focus optical systems have been proposed as an optical system for such a small imaging system. For example, Japanese Patent Application Laid-Open No. 2014-109700 discloses a single-focus optical system having a relatively long focal length, the system equipped with, in order from the object side: a front group having positive refractive power; an aperture stop; and a rear group having negative refractive power. Generally, in a telephoto lens having a long focal length, chromatic aberration occurs more frequently as the focal length is longer. Accordingly, in the single-focus optical system disclosed in Japanese Patent Application Laid-Open No. 2014-109700 for example, excellent image formation performance is implemented by arranging a diffraction grating surface in an optical path and correcting the chromatic aberration with the diffraction grating.

However, since the optical system disclosed in Japanese Patent Application Laid-Open No. 2014-109700 includes a large number of lenses, reduction in size of the optical system is not fully achieved. The optical system also has insufficient brightness as its F-number is larger than 2.8. In recent years, the optical system for small imaging systems are demanded to achieve further reduction in size. In the case of single-focus optical systems in particular, larger-aperture systems with F-number smaller than 2.8 are highly demanded.

An object of the present invention is to provide small, high-performance, and large-aperture optical system and image pickup apparatus which are suitable for a small imaging system.

SUMMARY OF THE INVENTION

In order to accomplish the above object, an optical system of the present invention includes, in order from an object side: a first lens group having positive refractive power; a second lens group having negative refractive power; and a third lens group having positive refractive power, wherein the first lens group and the third lens group are fixed in an optical axis direction while the second lens group is moved in the optical axis direction to focus on from an object at infinity to an object at a finite distance, the third lens group includes, in order from the object side: an object-side group; an aperture stop; and an image-side group, and a following condition is satisfied:

$$0.01 < f3b/f < 3.00 \tag{1}$$

where f3b represents a focal length of the image-side group, and f represents a focal length of the entire optical system.

The image pickup apparatus of the present invention includes: an optical system; and an image sensor provided on an image-plane side of the optical system for converting an optical image formed by the optical system into an electrical signal.

According to the present invention, it becomes possible to provide small, high-performance, and large-aperture optical system and image pickup apparatus which are suitable for a small imaging system.

DETAILED DESCRIPTION OF THE PREFERRED EMBODIMENTS

Figure 1:
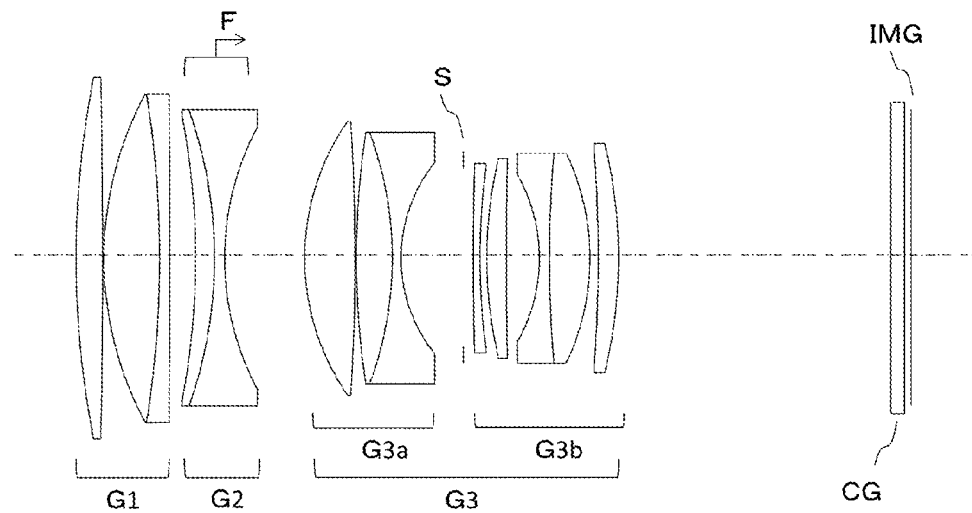
FIG. 1 is a cross sectional view illustrating an example of lens construction in an optical system of Example 1 of the present invention.

Hereinafter, embodiments of an optical system and an image pickup apparatus according to the present invention will be described.

1. Optical System 1-1. Construction of Optical System

The optical system according to the present invention includes, in order from the object side: a first lens group having positive refractive power; a second lens group having negative refractive power; and a third lens group having positive refractive power, wherein the first lens group and the third lens group are fixed in an optical axis direction while the second lens group is moved in the optical axis direction to focus on from an object at infinity to an object at a finite distance, the third lens group includes, in order from the object side: an object-side group; an aperture stop; and an image-side group, and a condition expressed by a later-described expression (1) is satisfied. First, the construction of the optical system according to the present invention will be described.

In the optical system according to the present invention, the first lens group arranged closest to the object side has positive refractive power. Accordingly, the light converged by the first lens group enters into the second lens group, so that the second lens group can be constructed from lenses with small external diameters. This makes it possible to achieve reduction in size and weight of the second lens group. Since the second lens group has negative refractive power, the optical system can be constructed as a telephoto type. Accordingly, the overall optical length can be made shorter than the focal length of the entire system, which makes it possible to achieve reduction in size of the entire system. Moreover, since the third lens group arranged closest to the image-plane side has positive refractive power, luminous flux can be collected by the third lens group, which makes it possible to achieve a larger-aperture system. More specifically, according to the present invention, a three-group construction is adopted which includes three lens groups having positive, negative, and positive refractive power, respectively. As a result, it becomes possible to provide a small-size and large-diameter optical system suitable for a small imaging system.

In the present invention, the first lens group and the third lens group are fixed in an optical axis direction while the second lens group is moved in the optical axis direction to focus on from an object at infinity to an object at a finite distance. As described before, the convergence action of the first lens group allows reduction in size and weight of the second lens group serving as a focusing group. Accordingly, the load for moving the second lens group is small, which makes it possible to achieve execution of quick focusing operation and to achieve reduction in size of the entire system. Hereinafter, the construction of each lens group will be described.

(1) First Lens Group

Specific details of the lens construction of the first lens group are not particularly limited as long as the first lens group has positive refractive power and satisfies later-described expressions and the like.

(2) Second Lens Group

Specific details of the lens construction of the second lens group are also not particularly limited as long as the second lens group has negative refractive power and satisfies later-described expressions and the like. However, the second lens group preferably has at least one lens having positive refractive power. When at least one lens having positive refractive power is arranged in the second lens group having negative refractive power, it becomes possible to suppress variation in chromatic aberration relating to movement of the second lens group at the time of focusing and to thereby provide excellent image formation performance regardless of a distance to a subject.

Furthermore, the second lens group preferably includes one lens having positive refractive power and one lens having negative refractive power. When the second lens group includes one positive lens and one negative lens, the second lens group can be made smaller and lighter, which makes it possible to execute quicker focusing operation. In this case, the second lens group preferably includes a cemented lens formed by cementing one lens having positive refractive power and one lens having negative refractive power. When the second lens group includes the cemented lens, manufacturing errors during a construction process can be reduced, and occurrence of aberration attributed to the manufacturing errors can be suppressed.

(3) Third Lens Group

In the present invention, the third lens group includes, in order from the object side: an object-side group; an aperture stop; and an image-side group that satisfies an expression (1). More specifically, in the third lens group, the object-side group and the image-side group are arranged across the aperture stop. This makes it easy for aberrations, which occur in relation to both axial light beams and off-axis light beams, to cancel each other before and after the aperture stop. As a result, a high-performance optical system can be provided.

In the third lens group, the refractive power of the object-side group is not particularly limited. In the optical system, when the image-side group having positive refractive power is arranged closest to the image-plane side, the optical system with a larger-aperture can be implemented as described before.

In the third lens group, the radius of curvature of a surface of the object-side group closest to the image-plane side and the radius of curvature of a surface of the object-side group closest to the object side preferably satisfy later-described expressions (3) and (4), respectively. The description of these points will be provided later.

A surface of the image-side group closest to the image-plane side preferably has a convex shape toward the image-plane side. More specifically, when the final surface in the optical system has a convex shape toward the image-plane side, luminous flux can be collected on the final surface, so that a larger-aperture system may be achieved without increasing the lens diameter of the optical system.

(4) Image Stabilization Group

In the optical system according to the present invention, part of any one lens group, out of the lens groups including the aforementioned first lens groups to third lens groups, may be moved in a direction perpendicular to the optical axis so as to be used as an image stabilization group for correcting rotation shake and the like resulting from vibration during imaging or from other factors.

1-2. Expressions

A description is now given of the conditions that the optical system according to the present invention should satisfy or may preferably satisfy.

1-2-1. Expression (1)

In the optical system according to the present invention, the image-side group satisfies a following condition:

$$0.01 < f3b/f < 3.00 \quad (1)$$

where f3b represents a focal length of the image-side group, and f represents a focal length of the optical system.

The expression (1) above is an expression that defines a ratio of the focal length of the image-side group to the focal length of the optical system. When the expression (1) is satisfied, luminous flux can be collected by the image-side group arranged closest to the image-plane side in the optical system, so that the optical system with a larger-aperture can be implemented. Moreover, various aberrations may sufficiently be corrected, which makes it possible to achieve the optical system with a smaller size and higher performance.

On the contrary, when a value of f3b/f in the expression (1) becomes equal to or above the upper limit, the focal length of the image-side group becomes excessively large relative to the focal length of the optical system. This is not preferable since sufficient collection of luminous flux by the image-side group is hindered and it becomes difficult to achieve the system with a larger-aperture. When the value of f3b/f in the expression (1) becomes equal to or below the lower limit, the focal length of the image-side group becomes excessively small relative to the focal length of the optical system. This is not preferable either since it becomes difficult to correct spherical aberration, coma aberration, and field curvature.

To obtain the aforementioned advantages of the present invention, it is preferable for the image-side group to satisfy a following expression (1)', it is more preferable to satisfy a following expression (1)", and it is still more preferable to satisfy a following expression (1)''':

$$0.10 < f3b/f < 2.50 \quad (1)'$$

$$0.20 < f3b/f < 2.00 \quad (1)''$$

$$0.30 < f3b/f < 1.50 \quad (1)'''$$

1-2-2. Expression (2)

In the optical system according to the present invention, the third lens group preferably satisfies a following condition:

$$0.50 < f3/f < 1.10 \quad (2)$$

where f3 represents a focal length of the third lens group.

The expression (2) is an expression that defines a ratio of the focal length of the third lens group to the focal length of the optical system of the present invention. When the expression (2) is satisfied, it becomes possible to implement the optical system with further smaller size and higher performance as well as with a larger-aperture.

On the contrary, when a value of f3/f in the expression (2) becomes equal to or above the upper limit, the focal length of the third lens group becomes excessively large relative to the focal length of the optical system. As a result, the overall length of the optical system increases, which makes it difficult to achieve reduction in size of the optical system. At the same time, the third lens group fails to converge sufficient luminous flux, which makes it difficult to make the optical system with a larger-aperture. Because of these points, it is not preferable that the value of f3/f in the expression (2) becomes equal to or above the upper limit. When the value of f3/f in the expression (2) becomes equal to or below the lower limit, the focal length of the third lens group becomes excessively small relative to the focal length of the optical system. This is not preferable since it becomes difficult to correct spherical aberration and coma aberration.

To achieve the aforementioned advantages of the present invention, it is preferable for the third lens group to satisfy a following expression (2)', and it is more preferable to satisfy an expression (2)":

$$0.55 < f3/f < 1.00 \quad (2)'$$

$$0.60 < f3/f < 0.95 \quad (2)''$$

1-2-3. Expression (3)

In the optical system according to the present invention, a surface of the object-side group closest to the object side preferably satisfies a following condition:

$$0 < Cr3af/f \quad (3)$$

where Cr3af represents a radius of curvature of the surface of the object-side group closest to the object side.

The expression (3) is an expression that defines a ratio of the radius of curvature of the surface of the object-side group closest to the object side to the focal length of the optical system. When the expression (3) is satisfied, the surface of the object-side group closest to the object side has a convex shape toward the object side. Accordingly, it becomes possible to sufficiently correct spherical aberration and field curvature with a small number of lenses. This makes it easy to provide a small and high-performance optical system.

On the contrary, when a value of Cr3af in the expression (3) becomes equal to or below the lower limit, the surface of the object-side group closest to the object side has a shape flat or concave toward the object side. In this case, it becomes difficult to sufficiently correct spherical aberration or field curvature with a small number of lenses, which in turns makes it difficult to achieve reduction in size of the optical system while maintaining sufficient image formation performance.

To achieve the aforementioned advantages of the present invention, it is preferable for the surface of the object-side group closest to the object side to satisfy a following expression (3)', it is more preferable to satisfy an expression (3)", it is still more preferable to satisfy an expression (3)''', and it is most preferable to satisfy an expression (3)'''':

$$0.10 < Cr3af/f < 20.00 \quad (3)'$$

$$0.14 < Cr3af/f < 10.00 \quad (3)''$$

$$0.20 < Cr3af/f < 5.00 \quad (3)'''$$

$$0.26 < Cr3af/f < 2.00 \quad (3)''''$$

1-2-4. Expression (4)

In the optical system according to the present invention, the surface of the object-side group closest to the object side and the surface of the object-side group closest to the image-plane side preferably satisfy a following condition:

$$1.0 < Cr3af/Cr3ar < 4.0 \quad (4)$$

where Cr3ar represents a radius of curvature of the surface of the object-side group closest to the image-plane side.

The expression (4) above is an expression that defines a ratio of the radius of curvature of the surface of the object-side group closest to the object side to the radius of curvature of the surface of the object-side group closest to the image-plane side. When the expression (4) is satisfied, it becomes possible to perform sufficient correction of spherical aberration, coma aberration, and sagittal flare with a small number of lenses. This makes it easier to provide a small and high-performance optical system.

On the contrary, when the surface of the object-side group closest to the object side and the surface of the object-side group closest to the image-plane side fail to satisfy the expression (4), it becomes difficult to correct spherical aberration, coma aberration, and sagittal flare with a small number of lenses. This is not preferable since the number of lenses necessary for aberration correction increases and the optical system is enlarged for the sake of achieving sufficient image formation performance.

To achieve the aforementioned advantages of the present invention, it is more preferable for the surface of the object-side group closest to the object side and the surface of the object-side group closest to the image-plane side to satisfy an expression (4)':

$$1.0 < Cr3af/Cr3ar < 3.0 \quad (4)'$$

1-2-5. Expression (5)

In the optical system according to the present invention, the second lens group preferably satisfies a following condition:

$$0.30 < |f2|/f < 1.20 \quad (5)$$

where f2 represents a focal length of the second lens group.

The expression (5) is an expression that defines a ratio of the focal length of the second lens group to the focal length of the optical system. When the expression (5) is satisfied, the refractive power of the second lens group falls within a proper range, so that an optical system with a small telephoto ratio can be provided. More specifically, it becomes possible to provide a small optical system whose overall optical length is small relative to the focal length. Moreover, since the refractive power of the second lens group serving as a focusing group falls within a proper range, it becomes possible to suppress variation in aberration at the time of focusing and to achieve sufficient image formation performance with a small number of lenses regardless of the distance to a subject. As a result, it becomes easy to provide a small and high-performance optical system.

On the contrary, when a value of |f2|/f in the expression (5) becomes equal to or above the upper limit, the focal length of the second lens group becomes excessively large relative to the focal length of the optical system. As a result, it becomes difficult to decrease the telephoto ratio. In this case, the overall optical length is enlarged, which is not preferable for achieving reduction in size of the optical system. When the value of |f2|/f in the expression (5) becomes equal to or below the lower limit, the focal length of the second lens group becomes excessively small relative to the focal length of the optical system. As a result, the refractive power of the second lens group serving as a focusing group becomes larger, which increases the amount of aberration generated by change in position at the time of focusing. Accordingly, the number of lenses necessary for aberration correction increases, which makes it difficult to achieve reduction in size of the optical system while maintaining sufficient image formation performance.

To achieve the aforementioned advantages of the present invention, it is preferable for the second lens group to satisfy a following expression (5)', it is more preferable to satisfy an expression (5)'', it is still more preferable to satisfy an expression (5)''', and it is most preferable to satisfy an expression (5)'''':

$$0.40<|f2|/f<1.10 \quad (5)'$$

$$0.40<|f2|/f<1.00 \quad (5)''$$

$$0.40<|f2|/f<0.92 \quad (5)'''$$

$$0.59<|f2|/f<0.92 \quad (5)''''$$

1-2-6. Expression (6)

In the optical system according to the present invention, the third lens group preferably satisfies a following condition:

$$1.8<f3/(f \times \tan \omega)<5.0 \quad (6)$$

where f3 represents a focal length of the third lens group, and ω represents a half angle of View when the optical system focuses at infinity.

The expression (6) is an expression that defines a ratio of the focal length of the third lens group to an image height in imaging by the optical system. When the expression (6) is satisfied, it becomes easy for aberrations, which occur in relation to both axial light beams and off-axis light beams, to cancel each other before and after the aperture stop in the third lens group. As a result, a high-performance optical system can be provided.

Contrary to this, when the expression (6) is not satisfied, it becomes difficult for the aberrations to cancel each other before and after the aperture stop. This is not preferably since it becomes difficult to decrease the aberrations that occur in relation to both axial light beams and off-axis light beams.

To achieve the aforementioned advantages of the present invention, it is preferable for the third lens group to satisfy a following expression (6)', and it is more preferable to satisfy an expression (6)'':

$$2.0<f3/(f \times \tan \omega)<4.2 \quad (6)'$$

$$2.2<f3/(f \times \tan \omega)<4.2 \quad (6)''$$

1-2-7. Expression (7)

In the optical system according to the present invention, the object-side group and the image-side group preferably satisfy a following condition:

$$1.0<|f3a|/f3b \quad (7)$$

where f3a represents a focal length of the object-side group, and f3b is as described before.

The expression (7) above is an expression that defines a ratio of the focal length of the object-side group to the focal length of the image-side group in the third lens group. When the expression (7) is satisfied, the refractive power of the image-side group becomes proper, so that luminous flux can be converged by the third lens group. This makes it easy to implement the optical system with a larger-aperture.

When the expression (7) above is not satisfied, the focal length of the image-side group becomes larger and the refractive power is lowered. This is not preferable since it becomes difficult to implement the optical system with a larger-aperture.

To achieve the aforementioned advantages of the present invention, it is more preferable for the object-side group and the image-side group to satisfy a following expression (7)':

$$1.3<|f3a|/f3b \quad (7)'$$

As described before, the image-side group preferably has positive refractive power. The object-side group may have positive or negative refractive power, but the object-side group may more preferably have positive refractive power. When both the object-side group and the image-side group have positive refractive power, it becomes easy for the aberrations to cancel each other before and after the aperture stop, so that a high-performance optical system can be provided.

1-2-8. Expression (8)

In the optical system according to the present invention, the first lens group preferably satisfies a following condition:

$$0.60<f1/f<1.30 \quad (8)$$

where f1 represents a focal length of the first lens group, and f represents a focal length of the optical system.

The expression (8) is an expression that defines a ratio of the focal length of the first lens group to the focal length of the optical system. When the expression (8) is satisfied, the focal length of the first lens group relative to the focal length of the optical system falls within a proper range. As a result, it becomes possible to implement the optical system with a smaller size and higher performance as well as with a larger-aperture.

On the contrary, when a value of f1/f in the expression (8) becomes equal to or above the upper limit, the focal length of the first lens group becomes excessively large relative to the focal length of the optical system. This is not preferable since the overall length of the optical system increases and a peripheral illumination becomes hard to secure. When the value of f1/f in the expression (8) becomes equal to or below the lower limit, the focal length of the first lens group becomes excessively small relative to the focal length of the optical system. As a result, it becomes difficult to correct axial chromatic aberration, coma aberration, and field curvature. This is not preferable since sufficient image formation performance cannot be achieved.

To achieve the aforementioned advantages, it is preferable for the optical system of the present invention to satisfy a following expression (8)', it is more preferable to satisfy an expression (8)", it is still more preferable to satisfy an expression (8)''', and it is most preferable to satisfy an expression (8)'''':

$$0.70 < f1/f < 1.20 \quad (8)'$$

$$0.75 < f1/f < 1.20 \quad (8)''$$

$$0.80 < f1/f < 1.10 \quad (8)'''$$

$$0.80 < f1/f < 1.03 \quad (8)''''$$

1-2-9. Expression (9)

When the optical system includes an image stabilization group, it is preferable that the image stabilization group satisfies a following condition. When the condition is satisfied, variation in aberration at the time of image stabilization can be suppressed, and high image formation performance can be provided even in image stabilization operation while the optical system is kept in a small size.

$$0.1 < |(1-\beta vc) \times \beta r| < 0.8 \quad (9)$$

wherein the image stabilization group refers to a lens group movable in a direction perpendicular to the optical axis, βvc represents a lateral magnification of the image stabilization group at infinity focusing, and βr represents a composite lateral magnification when all the lenses, which are positioned on the image side behind the image stabilization group, focus at infinity.

2. Image Pickup Apparatus

A description is now given of an image pickup apparatus according to the present invention. The image pickup apparatus according to the present invention includes: an optical system according to the present invention; and an image sensor provided on an image-plane side of the optical system for converting an optical image formed by the optical system into an electrical signal. The image sensor and the like are not particularly limited. Solid-state image sensors, such as CCD sensors and CMOS sensors, may be used. The image pickup apparatus according to the present invention is suitable as an image pickup apparatus with use of these solid-state image sensors such as digital cameras and video cameras. It is naturally understood that the image pickup apparatus of the present invention may be of a lens-fixed type wherein lenses are fixed to a casing, and may be of a lens-interchangeable type, such as single-lens reflex cameras and mirror-less single lens cameras.

Now, the present invention will specifically be described by using examples. However, the present invention is not limited to the following examples. Optical systems in each of the following examples are imaging optical systems used for image pickup apparatuses (optical apparatuses), such as digital cameras, video cameras, and silver-salt film cameras. In each of the cross sectional views of lenses, the left-hand side of the page is an object side, and the right-hand side is an image-plane side.

Example 1

(1) Construction of Optical System

FIG. 1 is a cross sectional view of lenses for illustrating the lens construction when an optical system of Example 1 according to the present invention focuses at infinity. The optical system includes, in order from the object side: a first lens group G1 having positive refractive power; a second lens group G2 having negative refractive power; and a third lens group G3 having positive refractive power.

The first lens group G1 includes, in order from the object side: a lens L1 having positive refractive power; and a cemented lens formed by cementing a lens L2 having positive refractive power and a lens L3 having negative refractive power.

The second lens group G2 includes, in order from the object side: a cemented lens formed by cementing a lens L4 having positive refractive power with a concave facing the object side and a biconcave lens L5 having negative refractive power.

The third lens group G3 includes, in order from the object side: an object-side group G3a having positive refractive power; an aperture stop; and an image-side group G3b having positive refractive power. The object-side group G3a includes, in order from the object side: a lens L6 having positive refractive power with a convex facing the object side; and a cemented lens formed by cementing a lens L7 having positive refractive power and a biconcave lens L8 having negative refractive power. The image-side group G3b includes, in order from the object side: a lens L9 having negative refractive power; a lens L10 having positive refractive power; a cemented lens formed by cementing a lens L11 having negative refractive power and a lens L12 having positive refractive power, the lens L11 having a concave facing the object side; and a lens L13 having positive refractive power with a convex facing the image side.

When the optical system of Example 1 focuses on from an object at infinity to a short-distance object, the first lens group G1 and the third lens group G3 are fixed in an optical axis direction while the second lens group G2 moves to an image plane IMG side along the optical axis. When vibration occurs due to hand shake and the like during imaging, blurring of an image on the image plane IMG is corrected by moving the lens L10 in the image side group G3b of the third lens group G3, which serves as an image stabilization group, in the direction perpendicular to the optical axis. Instead of using the lens L10 included in the image-side group G3b of the third lens group G3 as an image stabilization group, the lens L9 arranged closest to the object side in the image-side group G3b may be used as an image stabilization group. In the case of the third lens group G3 instead of the above-stated lenses as an image stabilization group, the similar effects may also be obtained.

In FIG. 1, a reference character "S" illustrated between the object-side group G3a and the image-side group G3b in the third lens group G3 denotes an aperture stop. A reference character "CG" illustrated on the image-plane side of the third lens group G3 denotes a cover glass, such as low pass filters and infrared cut filters. A reference character "IMG" illustrated on the image-plane side of the cover glass denotes an image plane. Specifically, it denotes an imaging plane of a solid-state image sensor, such as CCD sensors and CMOS sensors, or a film plane of a silver-salt film. These reference characters and the like are the same in each of the cross sectional views of lenses illustrated in the following Examples 2 to 4.

(2) Typical Numerical Values

A description is now given of typical numerical values obtained by applying specific values of the optical system. Table 1 indicates lens data of the optical system. In Table 1, "Surface No." denotes the number of lens surfaces (surface number) counted from the object side, "r" denotes a radius of curvature of the lens surfaces, "d" denotes an axial interval between lens surfaces, "Nd" denotes a refractive index with respect to a d-line (wavelength λ=587.6 nm), and "vd" denotes an abbe number with respect to the d-line. Table 2 indicates variable intervals on the optical axis illustrated in Table 1. The values in each of the expressions (1) to (9) are indicated in Table 9. In each of the tables, all the lengths are stated in the unit of "mm", and all the image viewing angels are stated in the unit of "degree". The details regarding these tables apply to each of the tables in the following Examples 2 to 4, and therefore a description thereof will be omitted below.

Figure 2:
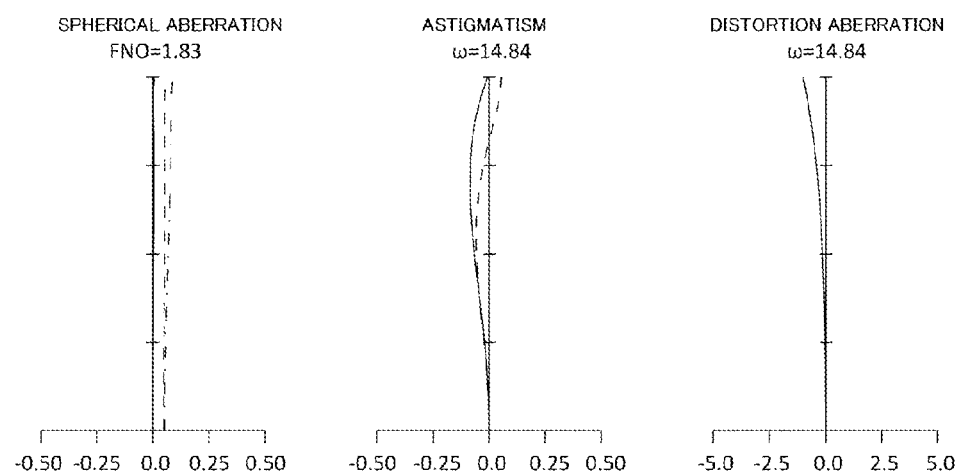
FIG. 2 illustrates diagrams of spherical aberration, astigmatism, and distortion aberration when the optical system of Example 1 focuses at infinity.

FIG. 2 illustrates longitudinal aberration diagrams of the optical system in infinity focusing. The longitudinal aberration diagrams illustrate a spherical aberration, an astigmatism, and a distortion aberration, respectively in order from the left-hand side on the page. In the diagram illustrating the spherical aberration, a vertical axis represents a ratio to a maximum aperture and a horizontal axis represents a defocus amount. In the diagram, a solid line, a dashed line, and a dashed dotted line represent spherical aberrations on a d-line (wavelength λ=587.6 nm), a C-line (wavelength λ=656.3 nm), and a g-line (wavelength λ=435.8 nm), respectively. In the diagram illustrating astigmatism, a vertical axis represents an image height and a horizontal axis represents a defocus amount. In the diagram, a solid line and a dashed line represent astigmatisms on a sagittal plane and a meridional plane, respectively. In the diagram illustrating distortion aberration, a vertical axis represents an image height and a horizontal axis represents % to indicate distortion aberration. The details regarding these longitudinal aberration diagrams apply to Examples 2 to 4, and therefore a description thereof will be omitted below.

The optical system of the present example has a focal length (f), an F-number (Fno), and a half image viewing angle (ω) as described below:

f=82.500

Fno=1.829

$\overline{\omega}$=14.835

TABLE 1

| Surface NO. | r | d | Nd | vd | |
|---|---|---|---|---|---|
| 1 | 136.9943 | 3.949 | 1.83481 | 42.72 | |
| 2 | −1343.8273 | 0.200 | | | |
| 3 | 50.9586 | 8.245 | 1.43700 | 95.10 | |
| 4 | −151.4848 | 1.500 | 1.84666 | 23.78 | |
| 5 | −2724.2546 | D6 | | | |
| 6 | −110.3115 | 2.800 | 1.84666 | 23.78 | |
| 7 | −64.8320 | 1.500 | 1.51680 | 64.20 | |
| 8 | 40.7708 | D9 | | | |
| 9 | 35.1699 | 7.463 | 1.83481 | 42.72 | |
| 10 | −309.4906 | 0.200 | | | |
| 11 | 123.5636 | 5.324 | 1.49700 | 81.61 | |
| 12 | −52.4842 | 1.300 | 1.64769 | 33.84 | |
| 13 | 22.4308 | 9.198 | | | (Aperture stop) |
| 14 | INF | 1.500 | | | (開口絞り) |
| 15 | 475.3063 | 1.000 | 1.67270 | 32.17 | |
| 16 | 102.2144 | 1.016 | | | |
| 17 | 63.3790 | 2.900 | 1.72916 | 54.67 | |
| 18 | 792.0189 | 4.876 | | | |
| 19 | −24.9593 | 1.500 | 1.64769 | 33.84 | |
| 20 | 181.2022 | 6.000 | 1.83481 | 42.72 | |
| 21 | −35.7170 | 1.236 | | | |
| 22 | −203.9183 | 3.000 | 1.95375 | 32.32 | |
| 23 | −70.4915 | 40.387 | | | |
| 24 | 0.0000 | 2.000 | 1.51680 | 64.20 | |
| 25 | 0.0000 | 1.000 | | | |

TABLE 2

| Imaging distance | INF | 800.00 |
|---|---|---|
| D6 | 3.831 | 13.705 |
| D9 | 11.874 | 2.000 |

Example 2

(1) Construction of Optical System

Figure 3:
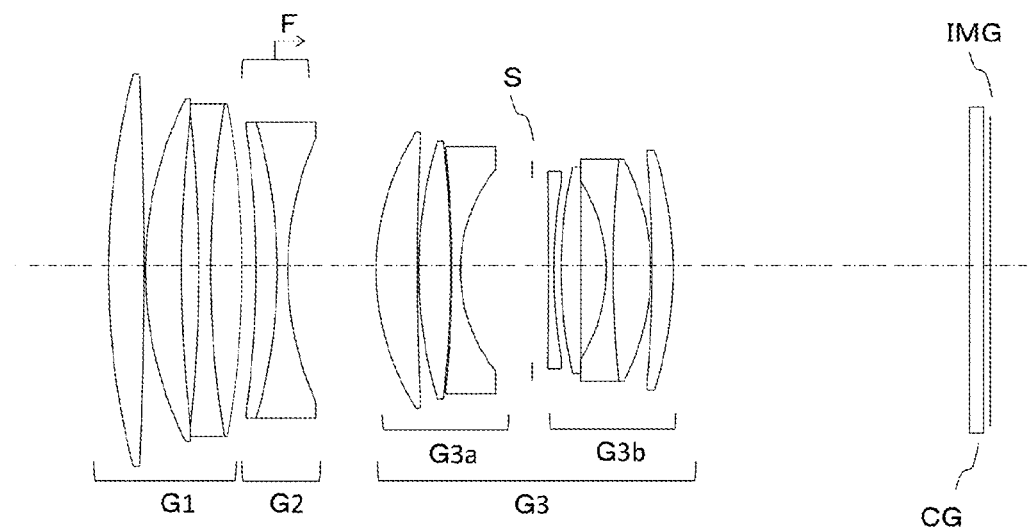
FIG. 3 is a cross sectional view illustrating an example of lens construction in an optical system of Example 2 of the present invention.

FIG. 3 is a cross sectional view of lenses for illustrating the lens construction when an optical system of Example 2 according to the present invention focuses at infinity. The optical system includes, in order from the object side: a first lens group G1 having positive refractive power; a second lens group G2 having negative refractive power, and a third lens group G3 having positive refractive power.

The first lens group G1 includes, in order from the object side: a lens L1 having positive refractive power; a lens L2 having positive refractive power; and a cemented lens formed by cementing a lens L3 having negative refractive power and a positive lens L4 having positive refractive power.

The second lens group G2 includes, in order from the object side, a cemented lens formed by cementing a lens L5 having positive refractive power and a biconcave lens L6 having negative refractive power, the lens L5 having a concave facing the object side.

The third lens group G3 includes, in order from the object side: an object-side group G3a having positive refractive power; an aperture stop; and an image-side group G3b having positive refractive power. The object-side group G3a includes, in order from the object side; a lens L7 having positive refractive power with a convex facing the object side; a lens L8 having positive refractive power; and a biconcave lens L9 having negative refractive power. The image-side group G3b includes, in order from the object side: a lens L10 having negative refractive power; a lens L11 having positive refractive power; a cemented lens formed by cementing a lens L12 having negative refractive power and a lens L13 having positive refractive power, the lens L12 having a concave facing the object side; and a lens L14 having positive refractive power with a convex facing the image side.

When the optical system of Example 2 focuses on from an object at infinity to a short-distance object, the first lens group G1 and the third lens group G3 are fixed in an optical axis direction while the second lens group G2 moves to an image plane IMG side along the optical axis. When vibration occurs due to hand shake and the like during imaging, blurring of an image on the image plane IMG is corrected by moving the lens L11 in the image-side group G3b of the third lens group G3, which serves as an image stabilization group, in the direction perpendicular to the optical axis. It should naturally be understood that as in Example 1, the lenses other than the lens L11 may be used as an image stabilization group.

(2) Typical Numerical Values

Figure 4:
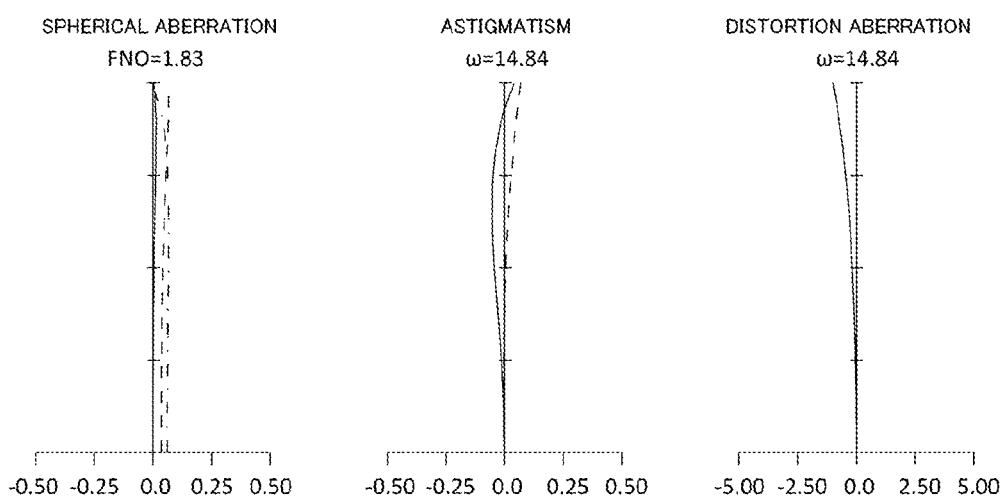
FIG. 4 illustrates diagrams of spherical aberration, astigmatism, and distortion aberration when the optical system of Example 2 focuses at infinity.

A description is now given of typical numerical values obtained by applying specific values of the optical system. Table 3 indicates lens data of the optical system, and Table 4 indicates variable intervals on the optical axis illustrated in Table 3. Table 9 indicates numerical values used in each of the expressions (1) to (9). Furthermore, FIG. 4 illustrates longitudinal aberration diagrams when the optical system focuses at infinity.

The optical system of the present example has a focal length (f), an F-number (Fno), and a half image viewing angle (ω) as described below:
f=82.500
Fno=1.830
ω̄=14.835

TABLE 3

| Surface NO. | r | d | Nd | vd | |
|---|---|---|---|---|---|
| 1 | 111.0544 | 5.034 | 1.83481 | 42.72 | |
| 2 | −633.0510 | 0.200 | | | |
| 3 | 54.1321 | 5.106 | 1.49700 | 81.61 | |
| 4 | 188.4730 | 2.429 | | | |
| 5 | −213.0729 | 1.700 | 1.79098 | 27.60 | |
| 6 | 140.7417 | 4.436 | 1.43875 | 94.94 | |
| 7 | −135.8544 | D8 | | | |
| 8 | −141.2148 | 3.000 | 1.84666 | 23.78 | |
| 9 | −74.1810 | 1.500 | 1.57809 | 64.20 | |
| 10 | 45.3199 | D11 | | | |
| 11 | 36.3762 | 5.818 | 1.83481 | 42.72 | |
| 12 | 370.8124 | 0.200 | | | |
| 13 | 63.3674 | 4.499 | 1.64822 | 60.45 | |
| 14 | −164.9546 | 0.200 | | | |
| 15 | −157.4577 | 1.200 | 1.66654 | 32.68 | |
| 16 | 22.7400 | 10.138 | | | |
| 17 | INF | 2.342 | | | (開口絞り) |
| 18 | −804.9285 | 0.800 | 1.53527 | 57.43 | (Aperture stop) |
| 19 | 77.9404 | 1.000 | | | |
| 20 | 65.6129 | 2.800 | 1.72916 | 54.67 | |
| 21 | 0.0000 | 3.607 | | | |
| 22 | −23.3779 | 1.000 | 1.69346 | 30.59 | |
| 23 | 153.6514 | 5.304 | 1.83481 | 42.72 | |
| 24 | −34.0115 | 0.200 | | | |
| 25 | −167.8394 | 2.939 | 1.95375 | 32.32 | |
| 26 | −55.9810 | 42.009 | | | |
| 27 | 0.0000 | 2.000 | 1.51680 | 64.20 | |
| 28 | 0.0000 | 1.000 | | | |

TABLE 4

| Imaging distance | INF | 800.00 |
|---|---|---|
| D8 | 2.000 | 12.540 |
| D11 | 12.540 | 2.000 |

Example 3

(1) Construction of Optical System

Figure 5:
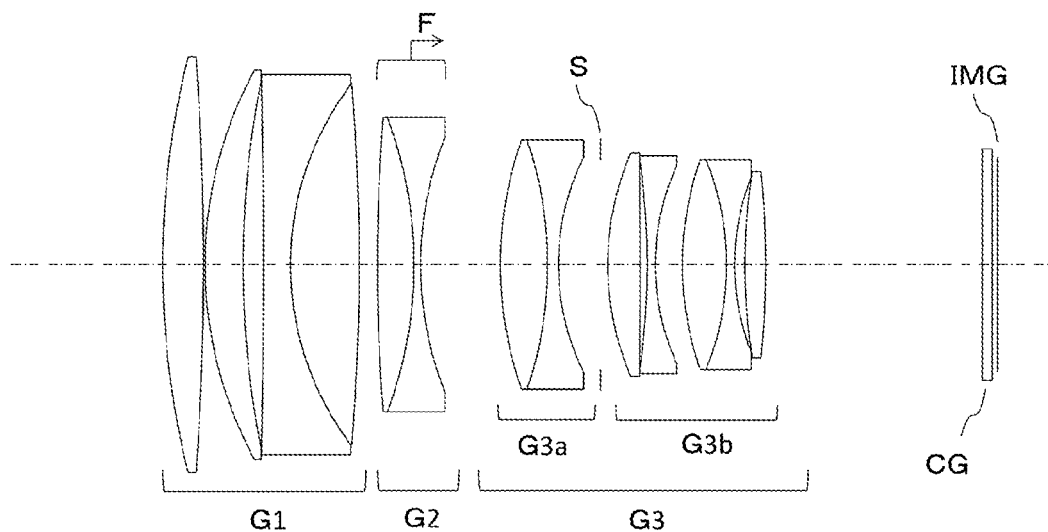
FIG. 5 is a cross sectional view illustrating an example of lens construction in an optical system of Example 3 of the present invention.

FIG. 5 is a cross sectional view of lenses for illustrating the lens construction when Example 3 according to the present invention focuses at infinity. The optical system includes, in order from the object side: a first lens group G1 having positive refractive power; a second lens group G2 having negative refractive power; and a third lens group G3 having positive refractive power.

The first lens group G1 includes, in order from the object side: a lens L1 having positive refractive power; a lens L2 having positive refractive power; and a cemented lens formed by cementing a lens L3 having negative refractive power and a lens L4 having positive refractive power.

The second lens group G2 includes, in order from the object side: a cemented lens formed by cementing a lens L5 having positive refractive power and a biconcave lens L6 having negative refractive power, the lens L5 having a convex facing the image-plane side.

The third lens group G3 includes, in order from the object side: an object-side group G3a having negative refractive power; an aperture stop; and an image-side group G3b having positive refractive power. The object-side group G3a includes, in order from the object side, a cemented lens formed by cementing a lens L7 having positive refractive power and a biconcave lens L8 having negative refractive power, the lens L7 having a convex facing the object side. The image-side group G3b includes, in order from the object side: a lens L9 having positive refractive power; a biconcave lens L10 having negative refractive power; a cemented lens formed by cementing a biconvex lens L11 having positive refractive power and a biconcave lens L12 having negative refractive power; and a lens L13 having positive refractive power with a convex facing the image side.

When the optical system of Example 3 focuses on from an object at infinity to a short-distance object, the first lens group G1 and the third lens group G3 are fixed in an optical axis direction while the second lens group G2 moves to an image plane IMG side along the optical axis. When vibration occurs due to hand shake and the like during imaging, blurring of an image on the image plane IMG is corrected by moving the lens L13 in the image-side group G3b of the third lens group G3, which serves as an image stabilization group, in the direction perpendicular to the optical axis. It should naturally be understood that as in Example 1, the lenses other than the lens L13 may be used as an image stabilization group.

(2) Typical Numerical Values

Figure 6:
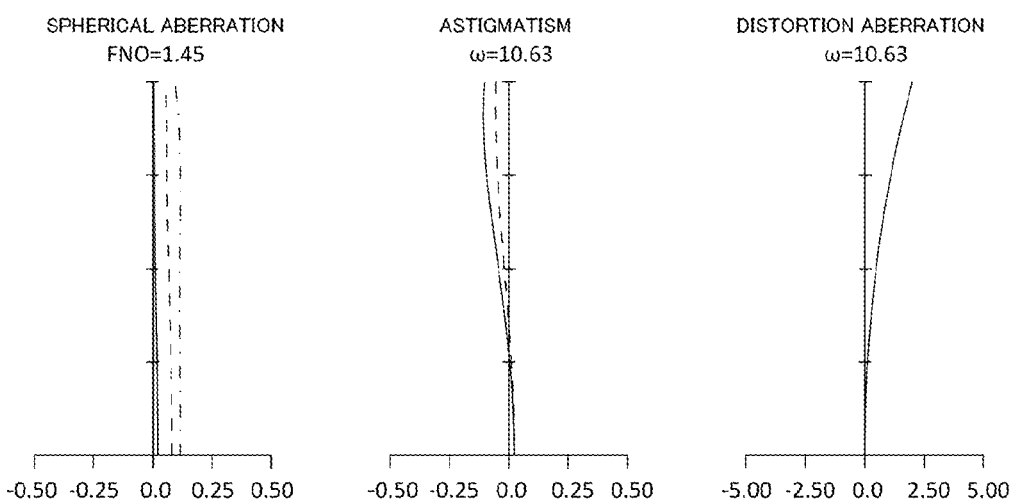
FIG. 6 illustrates diagrams of spherical aberration, astigmatism, and distortion aberration when the optical system of Example 3 focuses at infinity.

A description is now given of typical numerical values obtained by applying specific values of the optical system. Table 5 indicates lens data of the optical system, and Table 6 indicates variable intervals on the optical axis illustrated in Table 5. Table 9 indicates numerical values used in each of the expressions (1) to (9). Furthermore, FIG. 6 illustrates longitudinal aberration diagrams when the optical system focuses at infinity.

The optical system of the present example has a focal distance (f), an F-number (Fno), and a half image viewing angle (ω̄) as described below:
f=113.000
Fno=1.456
ω̄=10.632

TABLE 5

| Surface NO. | r | d | Nd | vd | |
|---|---|---|---|---|---|
| 1 | 169.5961 | 8.129 | 1.80420 | 46.50 | |
| 2 | −565.0665 | 0.300 | | | |
| 3 | 80.1740 | 7.570 | 1.88100 | 40.14 | |
| 4 | 184.8786 | 4.006 | | | |
| 5 | −1759.8053 | 5.430 | 1.68893 | 31.16 | |
| 6 | 58.7479 | 13.680 | 1.49700 | 81.61 | |
| 7 | −429.4037 | D8 | | | |
| 8 | 359.5742 | 7.310 | 1.80809 | 22.76 | |
| 9 | −82.1294 | 1.300 | 1.88100 | 40.14 | |
| 10 | 68.0222 | D11 | | | |
| 11 | 74.0332 | 9.400 | 1.72916 | 54.67 | |
| 12 | −76.7808 | 2.146 | 1.71736 | 29.50 | |
| 13 | 47.3187 | 8.400 | | | (Aperture stop) |
| 14 | 0.0000 | 1.440 | | | (開口絞り) |
| 15 | 55.4814 | 6.408 | 1.88100 | 40.14 | |
| 16 | −1699.5922 | 1.450 | | | |
| 17 | −143.0842 | 1.600 | 1.69895 | 30.05 | |
| 18 | 46.8539 | 5.400 | | | |
| 19 | 62.1770 | 8.794 | 2.00100 | 29.13 | |
| 20 | −54.6956 | 1.600 | 1.69895 | 30.05 | |
| 21 | 46.8048 | 2.070 | | | |
| 22 | 117.1331 | 4.130 | 1.88100 | 40.14 | |
| 23 | −179.3981 | 43.111 | | | |
| 24 | 0.0000 | 2.000 | 1.51680 | 64.20 | |
| 25 | 0.0000 | 1.000 | | | |

TABLE 6

| Imaging distance | INF | 1000.00 |
|---|---|---|
| D8 | 3.623 | 17.362 |
| D11 | 15.885 | 2.146 |

Example 4

(1) Construction of Optical System

Figure 7:
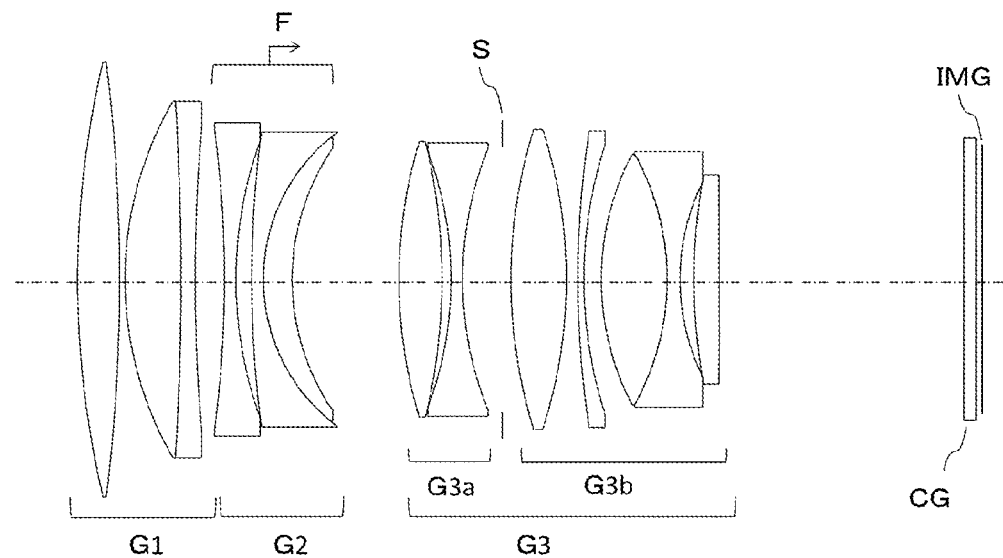
FIG. 7 is a cross sectional view illustrating an example of lens construction in an optical system of Example 4 of the present invention.

FIG. 7 is a cross sectional view of lenses for illustrating the lens construction when an optical system of Example 4 according to the present invention focuses at infinity. The optical system includes, in order from the object side: a first lens group G1 having positive refractive power; a second lens group G2 having negative refractive power; and a third lens group G3 having positive refractive power.

The first lens group G1 includes, in order from the object side: a lens L1 having positive refractive power; and a cemented lens formed by cementing a lens L2 having positive refractive power and a lens L3 having negative refractive power.

The second lens group G2 includes, in order from the object side: a biconcave lens L4 having negative refractive power; and a cemented lens formed by cementing a lens L5 having negative refractive power and a lens L6 having positive refractive power, the lens L5 having a concave facing the image-plane side.

The third lens group G3 includes, in order from the object side: an object-side group G3a having negative refractive power; an aperture stop; and an image-side group G3b having positive refractive power. The object-side group G3a includes, in order from the object side: a lens L7 having positive refractive power with a convex facing the object side; and a biconcave lens L8 having negative refractive power. The image-side group G3b includes, in order from the object side: a lens L9 having positive refractive power; a lens L10 having negative refractive power; a cemented lens formed by cementing a biconvex lens L11 having positive refractive power and a biconcave lens L12 having negative refractive power; and a lens L13 having positive refractive power with a convex facing the image side.

When the optical system of Example 4 focuses on from an object at infinity to a short-distance object, the first lens group G1 and the third lens group G3 are fixed in an optical axis direction while the second lens group G2 moves to an image plane IMG side along the optical axis. When vibration occurs due to hand shake and the like during imaging, blurring of an image on the image plane IMG is corrected by moving the lens L10 in the image-side group G3b of the third lens group G3, which serves as an image stabilization group, in the direction perpendicular to the optical axis. It should naturally be understood that as in Example 1, the lenses other than the lens L10 may be used as an image stabilization group.

(2) Typical Numerical Values

Figure 8:
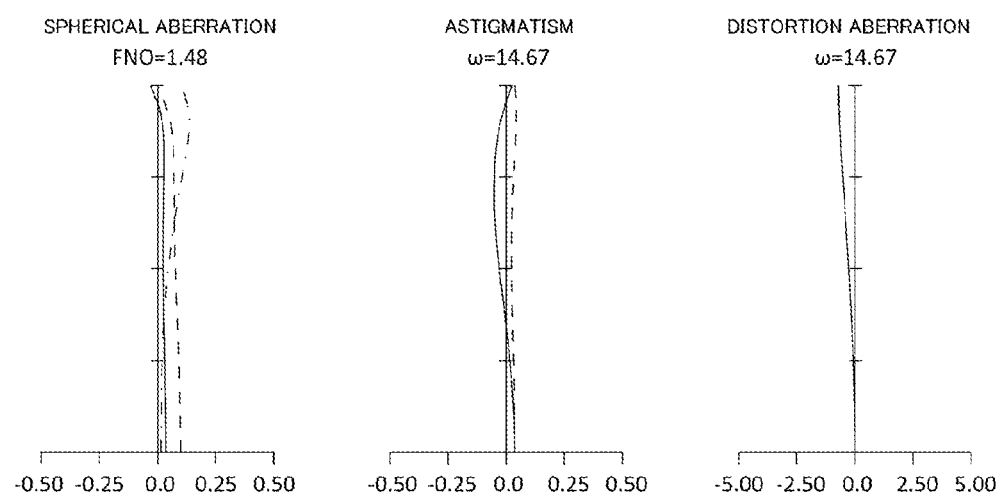
FIG. 8 illustrates diagrams of spherical aberration, astigmatism, and distortion aberration when the optical system of Example 4 focuses at infinity.

A description is now given of typical numerical values obtained by applying specific values of the optical system. Table 7 indicates lens data of the optical system, and Table 8 indicates variable intervals on the optical axis illustrated in Table 7. Table 9 indicates numerical values used in each of the expressions (1) to (9). Furthermore, FIG. 8 illustrates longitudinal aberration diagrams when the optical system focuses at infinity.

The optical system of the present example has a focal length (f), an F-number (Fno), and a half image viewing angle ($\omega$) as described below:

f=83.300
Fno=1.476
$\overline{\omega}$=14.665

TABLE 7

| Surface NO. | r | d | Nd | vd |
|---|---|---|---|---|
| 1 | 152.1262 | 6.865 | 1.72916 | 54.67 |
| 2 | −284.0479 | 0.880 | | |
| 3 | 57.3260 | 9.144 | 1.49700 | 81.61 |
| 4 | −448.8525 | 2.300 | 1.84666 | 23.78 |
| 5 | 276.0781 | D5 | | |
| 6 | −185.4005 | 1.900 | 1.48749 | 70.24 |
| 7 | 65.9621 | 2.582 | | |
| 8 | 185.6692 | 1.900 | 1.48749 | 70.44 |
| 9 | 29.5626 | 4.700 | 1.90366 | 31.31 |
| 10 | 37.5253 | D10 | | |
| 11 | 76.9019 | 7.000 | 1.59282 | 68.62 |
| 12 | −94.7793 | 1.500 | | |
| 13 | −58.6391 | 1.900 | 1.69895 | 30.05 |
| 14 | 56.5062 | 6.490 | | |
| 15 | 0.0000 | 1.397 | | (Aperture stop) |
| 16 | 81.3681 | 9.060 | 1.91082 | 35.25 |
| 17 | −78.0937 | 1.880 | | |
| 18 | 156.7608 | 0.984 | 1.48749 | 70.44 |
| 19 | 70.7126 | 2.850 | | |
| 20 | 43.5682 | 10.750 | 1.59282 | 68.62 |
| 21 | −41.4984 | 2.100 | 1.62004 | 36.30 |
| 22 | 35.4243 | 2.300 | | |
| 23 | 93.1880 | 4.120 | 1.91082 | 35.25 |
| 24 | −4810.7453 | 39.933 | | |
| 25 | 0.0000 | 2.000 | 1.51680 | 64.20 |
| 26 | 0.0000 | 1.0000 | | |

TABLE 8

| Imaging distance | INF | 850.00 |
|---|---|---|
| D5 | 4.785 | 15.103 |
| D10 | 17.448 | 7.130 |

TABLE 9

| | | Example 1 | Example 2 | Example 3 | Example 4 |
|---|---|---|---|---|---|
| Expression (1) | f3b/f | 0.807 | 0.867 | 0.572 | 0.481 |
| Expression (2) | f3/f | 0.829 | 0.806 | 0.762 | 0.722 |
| Expression (3) | Cr3af/f | 0.426 | 0.441 | 0.655 | 0.923 |
| Expression (4) | Cr3af/Cr3ar | 1.568 | 1.600 | 1.565 | 1.361 |
| Expression (5) | \|f2\|/f | 0.788 | 0.795 | 0.773 | 0.694 |
| Expression (6) | f3/(f × tan$\omega$) | 3.132 | 3.041 | 4.058 | 2.759 |
| Expression (7) | \|f3a\|/f3b | 2.854 | 2.223 | 3.718 | 2.718 |
| Expression (8) | f1/f | 0.932 | 0.960 | 0.853 | 0.965 |
| Expression (9) | \|(1 − $\beta$vc) × $\beta$r\| | 0.495 | 0.511 | 0.578 | 0.220 |

According to the present invention, it becomes possible to provide small, high-performance, and large-aperture optical system and image pickup apparatus which are suitable for a small-size imaging system.

REFERENCE SIGNS LIST

G1 First lens group
G2 Second lens group
G3 Third lens group
G3a Object-side group
G3b Image-side group
S Aperture stop CG Cover glass
IMG Image plane

What is claimed is:

1. An optical system, comprising, in order from an object side:
a first lens group having positive refractive power;
a second lens group having negative refractive power; and
a third lens group having positive refractive power, wherein
the first lens group and the third lens group are fixed in an optical axis direction while the second lens group is moved in the optical axis direction to focus on from an object at infinity to an object at a finite distance,
the third lens group comprises, in order from the object side: an object-side group; an aperture stop; and an image-side group, and
the following condition is satisfied:

$$0.01 < f3b/f < 3.00 \quad (1)$$

where f3b represents a focal length of the image-side group, and f represents a focal length of the optical system; wherein the third lens group satisfies the following condition:

$$0.722 \leq f3/f < 1.10 \quad (2)$$

where f3 represents a focal length of the third lens group; and wherein
a surface of the object-side group closest to the object side and a surface of the object-side group closest to an image side satisfy the following condition:

$$1.0 < Cr3af/Cr3ar < 4.0 \quad (4)$$

where Cr3af represents a radius of curvature of the surface of the object-side group closest to the object side, and Cr3ar represents a radius of curvature of the surface of the object-side group closest to the image-plane side.

2. The optical system according to claim 1, wherein the surface of the object-side group closest to the object side satisfies the following condition:

$$0 < Cr3af/f \quad (3).$$

3. The optical system according to claim 1, wherein the second lens group satisfies the following condition:

$$0.30 < |f2|/f < 1.20 \quad (5)$$

where
f2 represents a focal length of the second lens group.

4. The optical system according to claim 1, wherein the second lens group has at least one lens having positive refractive power.

5. The optical system according to claim 1, wherein the second lens group comprises one lens having positive refractive power and one lens having negative refractive power.

6. The optical system according to claim 1, wherein the third lens group satisfies the following condition:

$$1.8 < f3/(f \times \tan \omega) < 5.0 \quad (6)$$

where f3 represents a focal length of the third lens group, and
ω represents a half angle of View when the optical system focuses at infinity.

7. The optical system according to claim 1, wherein the object-side group and the image-side group satisfy the following condition:

$$1.0 < |f3a|/f3b \quad (7)$$

where f3a represents a focal length of the object-side group.

8. The optical system according to claim 1, wherein the first lens group satisfies the following condition:

$$0.60 < f1/f < 1.30 \quad (8)$$

where f1 represents a focal length of the first lens group.

9. An image pickup apparatus, comprising:
an optical system according to claim 1; and
an image sensor provided on an image-plane side of the optical system for converting an optical image formed by the optical system into an electrical signal.

* * * * *